(12) United States Patent
Yoshizaki et al.

(10) Patent No.: US 8,870,464 B2
(45) Date of Patent: Oct. 28, 2014

(54) BALL BEARING

(71) Applicant: JTEKT Corporation, Osaka (JP)

(72) Inventors: Koji Yoshizaki, Higashiosaka (JP); Junji Murata, Kashiba (JP)

(73) Assignee: Jtekt Corporation, Osaka (JP)

( * ) Notice: Subject to any disclaimer, the term of this patent is extended or adjusted under 35 U.S.C. 154(b) by 0 days.

(21) Appl. No.: 14/087,742

(22) Filed: Nov. 22, 2013

(65) Prior Publication Data

US 2014/0153853 A1   Jun. 5, 2014

(30) Foreign Application Priority Data

Dec. 4, 2012   (JP) ................................ 2012-265531

(51) Int. Cl.
*F16C 33/66*   (2006.01)
*F16C 19/04*   (2006.01)
*F16C 19/02*   (2006.01)

(52) U.S. Cl.
CPC ............. *F16C 33/6696* (2013.01); *F16C 19/02* (2013.01)
USPC ............ 384/463; 384/569; 384/490; 384/606

(58) Field of Classification Search
USPC ......... 384/462–463, 469, 477, 488, 490, 564, 384/606, 609, 622, 902
See application file for complete search history.

(56) References Cited

U.S. PATENT DOCUMENTS

| 2,785,023 | A | * | 3/1957 | Naumann | 384/469 |
| 3,144,278 | A | * | 8/1964 | Pöhler et al. | 384/493 |
| 3,332,728 | A | * | 7/1967 | Gibson | 384/501 |
| 3,675,978 | A | * | 7/1972 | McKelvey | 384/463 |
| 3,782,795 | A | * | 1/1974 | Richey et al. | 384/463 |
| 4,571,097 | A | * | 2/1986 | Lee et al. | 384/564 |
| 4,601,592 | A | * | 7/1986 | Jatczak et al. | 384/564 |
| 5,066,145 | A | * | 11/1991 | Sibley et al. | 384/499 |
| 5,356,227 | A | * | 10/1994 | Sibley et al. | 384/463 |
| 8,262,290 | B2 | * | 9/2012 | Feldmeier | 384/469 |
| 2013/0342060 | A1 | * | 12/2013 | Sibley | 384/463 |

FOREIGN PATENT DOCUMENTS

| JP | A-2002-357227 | 12/2002 |
| JP | A-2009-24796 | 2/2009 |
| JP | A-2010-19312 | 1/2010 |

OTHER PUBLICATIONS

Mar. 5, 2014 Extended European Search Report issued in European Application No. 13194199.9.

* cited by examiner

*Primary Examiner* — Marcus Charles
(74) *Attorney, Agent, or Firm* — Oliff PLC

(57) ABSTRACT

A ball bearing includes: an outer ring; an inner ring having a ring-shaped member fitted portion that has a step portion that extends generally along a radial direction of the outer ring and an outer peripheral face portion; balls disposed between an inner periphery raceway groove of the outer ring and an outer periphery raceway groove of the inner ring; and a ring-shaped lubricant supply member that is fixed to the ring-shaped member fitted portion while being in contact with the step portion.

2 Claims, 1 Drawing Sheet

US 8,870,464 B2

BALL BEARING

INCORPORATION BY REFERENCE

The disclosure of Japanese Patent Application No, 2012-265531 filed on Dec. 4, 2012 including the specification, drawings and abstract, is incorporated herein by reference in its entirety.

BACKGROUND OF THE INVENTION

1. Field of the Invention

The invention relates to a ball bearing that includes an outer ring, an inner ring, balls, and lubricant supply members.

2. Description of the Related Art

Japanese Patent Application Publication No. 2002-357227 (JP 2002-357227 A) describes a conventional ball bearing. The ball bearing includes an outer ring, an inner ring, a plurality of balls, and two shield plates. The balls are disposed between a raceway groove of the outer ring and a raceway groove of the inner ring. One of the shield plates seals one axial end of a ball arrangement chamber that is defined by the inner periphery of the outer ring and the outer periphery of the inner ring. The other one of the shield plates seals the other axial end of the ball arrangement chamber. Grease is sealed in the ball arrangement chamber.

A radially outer end of each shield plate is fixed to the inner periphery of the outer ring, whereas a radially inner end of each shield plate is located with a small clearance left between the radially inner end and the inner ring. In the ball bearing, a labyrinth seal is formed by the radially inner end of each shield plate and the outer periphery of the inner ring as described above to prevent the grease from leaking outside from the ball arrangement chamber. The labyrinth seal also prevents foreign matter from entering the ball arrangement chamber from the outside.

There has been a demand that the torque generated in the conventional ball bearing should be reduced. However, if the amount of grease sealed in the ball arrangement chamber is reduced to reduce the stirring resistance in an attempt to reduce the torque, seizure of the raceway grooves or the like may occur.

SUMMARY OF THE INVENTION

One object of the invention is to provide a ball bearing in which seizure of sliding portions such as bearing grooves is less likely to occur while the amount of lubricant having flowability and sealed in a ball arrangement chamber is reduced to reduce the torque generated in the ball bearing.

An aspect of the invention relates to a ball bearing including: an outer ring having an inner periphery raceway groove; an inner ring having an outer periphery raceway groove and a ring-shaped member fitted portion that has a step portion that extends generally along a radial direction of the outer ring and an outer peripheral face portion; balls disposed between the inner periphery raceway groove of the outer ring and the outer periphery raceway groove of the inner ring; and a ring-shaped lubricant supply member that is fixed to the ring-shaped member fitted portion while being in contact with the step portion.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described in detail with reference to the accompanying drawings.

Figure 1:
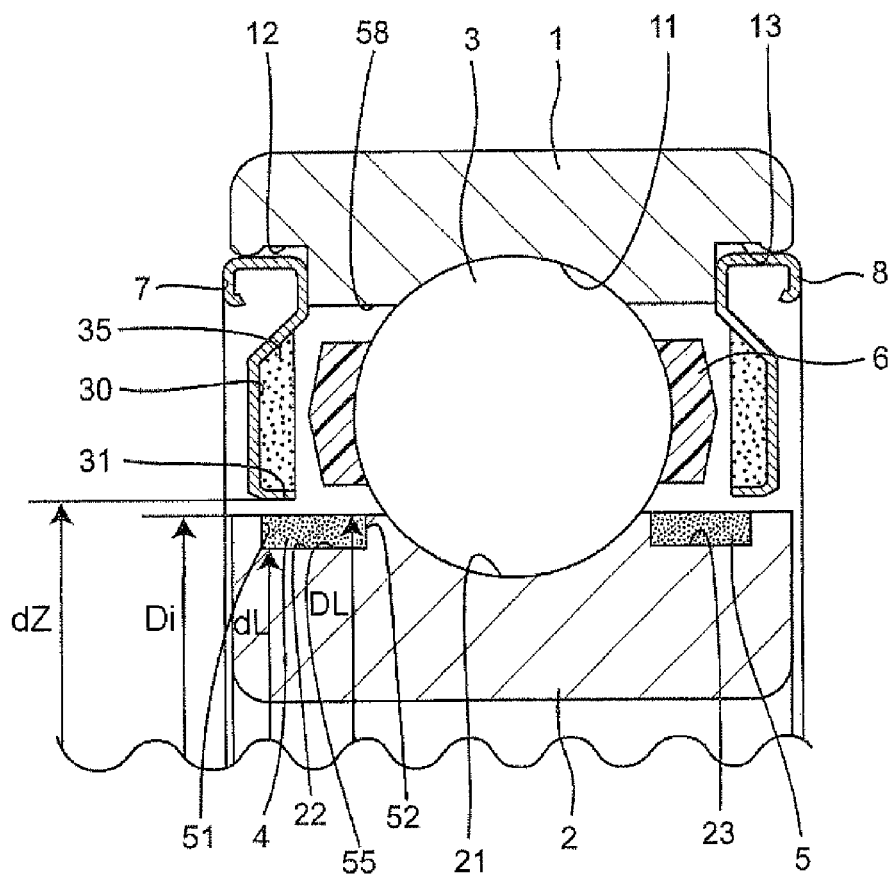
FIG. 1 is a half sectional view of a ball bearing according to an embodiment of the invention, which is taken along its axial direction.

FIG. 1 is a half sectional view of a ball bearing according to an embodiment of the invention, which is taken along its axial direction.

As illustrated in FIG. 1, the ball bearing includes an outer ring 1, an inner ring 2, a plurality of balls 3, a first lubricant supply member 4, a second lubricant member 5, a first shield plate 7, and a second shield plate 8.

The outer ring 1 has an inner periphery raceway groove 11, a first shield plate fitting groove 12, and a second shield plate fitting groove 13, all of which are formed in the inner periphery of the outer ring 1. The first shield plate fitting groove 12 is an annular groove, and formed in one end portion of the inner periphery of the outer ring 1. The second shield plate fitting groove 13 is an annular groove, and formed in the other end portion of the inner periphery of the outer ring 1. The inner periphery raceway groove 11 is located between the first shield plate fitting groove 12 and the second shield plate fitting groove 13.

The inner ring 2 has an outer periphery raceway groove 21, a first annular groove 22, and a second annular groove 23, all of which are formed in the outer periphery of the inner ring 2. The first annular groove 22 is formed in one end portion of the outer periphery of the inner ring 2. The second annular groove 23 is formed in the other end portion of the outer periphery of the inner ring 2. The outer periphery raceway groove 21 is located between the first annular groove 22 and the second annular groove 23.

The balls 3 are disposed between the inner periphery raceway groove 11 of the outer ring 1 and the outer periphery raceway groove 21 of the inner ring 2, and arranged at predetermined intervals in the circumferential direction, while being held by a cage 6. The inner periphery raceway groove 11 and the outer periphery raceway groove 21 are formed as deep raceway grooves. Each of the first and the second annular grooves 22, 23 is formed in the outer periphery of a raceway shoulder portion. In the present embodiment, the raceway grooves 11, 21, which are grooves of the deep groove ball bearing type, are employed, to form larger raceway shoulder portions, whereby the large raceway shoulder portions are effectively utilized. Each of the first and the second annular grooves 22, 23 constitutes a ring-shaped member fitted portion. Two side faces 51, 52 of each of the first and second annular grooves 22, 23 (reference numerals are not assigned to the side faces of the second annular grooves 23 in the drawing) constitute step portions of the ring-shaped member fitted portion.

The first lubricant supply member 4 is formed in an annular shape, and fixedly fitted in the first annular groove 22. The first lubricant supply member 4 is made of thermoplastic or thermosetting resin (for example, a resin containing elastomers, lubricant, and additives), molybdenum disulfide ($MoS_2$) solid lubricant, graphite solid lubricant, polytetrafluoroethylene (PTFE, the trade name of Teflon (registered trademark)) solid lubricant, or solid lubricant having a property that an oil content exudes therefrom, such as an oil-soluble organomolybdenum compound. The axial length of the first lubricant supply member 4 is the same as or slightly smaller than the axial length of the first annular groove 22. At least one of axial end faces of the first lubricant supply member 4 is in contact with a corresponding one of the side faces 51, 52 of the first annular groove 22. The first lubricant supply member 4 is fitted in the first annular groove 22.

The first shield plate 7 is made of a metal material or a resin material. The first shield plate 7 blocks most part of an opening between the outer ring 1 and the inner ring 2 on one side in the axial direction. A radially outer end portion of the first shield plate 7 is fixedly fitted in the first shield plate fitting groove 12. As illustrated in FIG. 1, the first lubricant supply member 4 extends in the axial direction from a position, at which the first lubricant supply member 4 overlaps with part of the first shield plate 7 in the radial direction, to a position at which the first lubricant supply member 4 overlaps with the cage 6 in the radial direction. A radially inner end portion of the first shield plate 7 faces the outer periphery of the inner ring 2 or the first lubricant supply member 4 in a non-contact state, with a clearance left therebetween in the radial direction.

The radially inner end portion the first shield plate 7, the outer periphery of the inner ring 2, and the outer periphery of the first lubricant supply member 4 from a labyrinth seal. That is, between a radially inner end face of the radially inner end portion of the first shield plate 7 and the outer periphery of the inner ring 2, there is formed a clearance of which the radial length is so small that foreign matter from the outside the ball bearing is prevented from passing therethrough and the grease is prevented from leaking outside from the ball bearing. In addition, the radial length of the clearance is set to such a value that wear particles generated in the ball bearing are not prevented from passing therethrough.

More specifically, as illustrated in FIG. 1, the first shield plate 7 has, at its radially inner end portion, a cylindrical portion 31 that extends in the axial direction. With this configuration, the axial length of the labyrinth seal is set long to improve the performance of the labyrinth, for example, the performance for preventing leakage of grease 35. In the ball bearing, the torque is greatly reduced due to the employment of the noncontact seal.

As illustrated in FIG. 1, an axially inner end face of the first shield plate 7 has a recess 30 that is opened inward in the axial direction. The recess 30 is filled with the grease 35, which is an example of the lubricant having flowability, at the start-up of the ball bearing. In the ball bearing, when the maximum outside diameter of a portion of the outer periphery of the inner ring 2, the portion being located on the opposite side of the first annular groove 22 from the outer periphery raceway groove 21 in the axial direction, is Di (mm), the inside diameter of the first lubricant supply member 4 is dL (mm), the inside diameter of the first shield plate 7 is dZ (mm), the elastic deformation limit of the first lubricant supply member 4 in the radial direction is δL (mm), and the outside diameter of the first lubricant supply member 4 is DL (mm), Di<dL+δL and DL<dZ are satisfied.

With this configuration, the first lubricant supply member 4 is allowed to move on the outer periphery of the inner ring 2 from an axially outer end of the inner ring 2 to the first annular groove 22 due to its elastic deformation, so that the first lubricant supply member 4 is fitted into the first annular groove 22.

In addition, in the ball bearing, when the linear expansion coefficient of the inner ring 2 is k1 (K$^{-1}$), the linear expansion coefficient of the first lubricant supply member 4 is k2 (K$^{-1}$), and the temperature obtained by subtracting the room temperature from the upper limit of the operating temperature of the ball bearing is ΔT (K), Di+k1·ΔT·Di>dL+k2·ΔT·dL is satisfied. With this configuration, at the operating temperature of the ball bearing, even if the inner ring 2 and the first lubricant supply member 4 expand or contract due to a temperature change, the inside diameter of the first lubricant supply member 4 does not exceed the maximum outside diameter of the portion of the outer periphery of the inner ring 2, the portion being located on the opposite side of the first annular groove 22 from the outer periphery raceway groove 21 in the axial direction. In this way, the movement of the first lubricant supply member 4 in the axial direction is restricted, so that the first lubricant supply member 4 is prevented from coming off the inner ring 2.

Mainly, the structure of a portion of the ball bearing on the left side in FIG. 1 has been described. The ball bearing is symmetric with respect to a plane that is perpendicular to the axial direction of the ball bearing and that divides the ball bearing in half in the axial direction. Therefore, the structure of a portion of the ball bearing on the right side in FIG. 1 will be omitted.

According to the embodiment described above, the annular lubricant supply members 4, 5 are fixed to ring-shaped member fitted portions that have outer peripheral face portions 55 and that are positioned at the outer peripheral side of the inner ring 2. Thus, the lubricant oil content is supplied from the lubricant supply members 4, 5 to the outer periphery raceway groove 21 that is adjacent to the lubricant supply members 4, 5 in the axial direction. Further, the lubricant oil content is smoothly supplied from the outer periphery raceway groove 21 to rolling contact surfaces of the balls 3, and the lubricant oil content is then supplied to the inner periphery raceway groove 11 through the rolling contact surfaces. Therefore, seizure of sliding portions such as the raceway grooves 11, 21 and the rolling contact surfaces is less likely to occur. In addition, the amount of grease sealed in a ball arrangement chamber 58 is reduced, whereby the stirring resistance is reduced. As a result, the torque generated in the ball bearing is reduced.

According to the embodiment described above, the ring-shaped member fitted portions are the annular grooves 22, 23 that are located at the outer periphery of the inner ring 2. Therefore, the movements of the lubricant supply members 4, 5 toward the one side and the other side in the axial direction are restricted by the two side faces 51, 52 of each of the annular grooves 22, 23. As a result, it is possible to prevent the lubricant supply members 4, 5 from moving from desired positions.

According to the embodiment described above, the lubricant supply members 4, 5 have the portions that overlap with the cage 6 in the radial direction. Therefore, the distance between each of the lubricant supply members 4, 5 and the outer periphery raceway groove 21 is small. With this configuration, the lubricant oil content is smoothly supplied from the lubricant supply members 4, 5 to the outer periphery raceway groove 21.

According to the embodiment described above, the lubricant supply members 4, 5 have the portions that overlap with the shield plates 7, 8 in the radial direction, respectively. Therefore, oil films are easily formed between the lubricant supply members 4, 5 and the radially inner end portions of the shield plates 7, 8, respectively. Therefore, high sealing performance of the labyrinth seal is ensured.

In the embodiment described above, the lubricant supply members 4, 5 have the portions that overlap with the cage 6 in the radial direction. However, the lubricant supply members in the invention need not have the portions that overlap with the cage in the radial direction.

In the embodiment described above, the lubricant supply members 4, 5 have the portions that overlap with the shield plates 7, 8 in the radial direction, respectively. However, the lubricant supply member in the invention need not have the portions that overlap with the shield plate in the radial direction.

In the embodiment described above, the lubricant supply members 4, 5 are annular members. However, the lubricant supply members in the invention may have a shape with a cutout portion at one position in the circumferential direction, such as a C-shape. The shape of the lubricant supply members is not particularly limited as long as the lubricant supply members have a ring shape.

In the embodiment described above, $Di+k1\cdot\Delta T\cdot Di > dL+k2\cdot\Delta T\cdot dL$ is satisfied. However, in the invention, $Di+k1\cdot\Delta T\cdot Di > dL+k2\cdot\Delta T\cdot dL$ need not be satisfied.

In the embodiment described above, the grease 35 is sealed in the ball arrangement chamber 58. However, in the invention, lubricant having flowability other than grease may be sealed in the ball arrangement chamber. For example, a lubricant having a viscosity that is lower than that of grease may be sealed in the ball arrangement chamber.

In the embodiment described above, as illustrated in FIG. 1, the outer peripheries of the lubricant supply members 4, 5 are flush with the outer peripheries of the raceway shoulder portions of the inner ring 2. The outer peripheries of the lubricant supply members 4, 5 and the outer peripheries of the raceway shoulder portions of the inner ring 2 each form part of a cylindrical outer peripheral face having a substantially constant outside diameter. However, in the invention, the outer peripheries of the lubricant supply members need not be flush with the outer peripheries of the raceway shoulder portions of the inner ring. The outside diameter of the outer periphery of each lubricant supply member may be larger than, the same as, or smaller than that of the outer periphery of each raceway shoulder portion of the inner ring. Note that, in terms of smooth supply of the lubricant oil content to the raceway grooves, the outside diameter of the outer periphery of each lubricant supply member is preferably larger than or the same as that of the outer periphery of each raceway shoulder portion of the inner ring.

In the embodiment described above, the shield plates 7, 8 each have the recess 30 that is opened inward in the axial direction, and the recess 30 is filled with the grease 35 at the start-up of the ball bearing. However, the shield plate in the invention need not have the recess that is opened inward in the axial direction.

Figure 2:
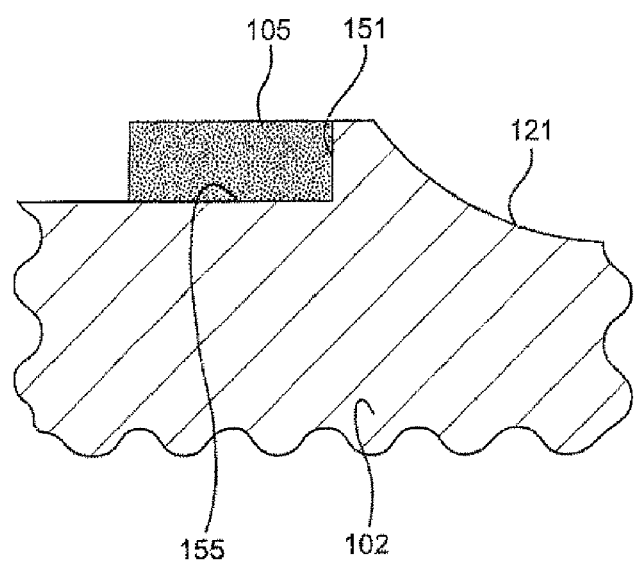
FIG. 2 is a schematic view illustrating of a modified example of a ring-shaped member fitted portion.

In the embodiment described above, the ring-shaped member fitted portions are the annular grooves 22, 23. However, as illustrated in FIG. 2, that is, a schematic view illustrating a modified example of the ring-shaped member fitted portion, the ring-shaped member fitted portion may be formed in each raceway shoulder portion of an inner ring 102, which is adjacent to an outer periphery raceway groove 121, and each ring-shaped member fitted portion may have only one step portion 151 that extends generally along the radial direction of the inner ring 102 (outer ring) and an outer peripheral face portion 155. An annular lubricant supply member 105 may be fitted, with an interference, to the outer peripheral face portion 155 of the ring-shaped member fitted portion while being in contact with the step portion 151.

According to the invention, it is possible to provide the ball bearing in which seizure of sliding portions such as the bearing grooves is less likely to occur while the amount of lubricant having flowability and sealed in the ball arrangement chamber is reduced to reduce the torque generated in the ball bearing.

What is claimed is:

1. A ball bearing comprising:
an outer ring having an inner periphery raceway groove;
an inner ring having an outer periphery raceway groove and a ring-shaped member fitted portion that has a step portion that extends generally along a radial direction of the outer ring and an outer peripheral face portion,
balls disposed between the inner periphery raceway groove of the outer ring and the outer periphery raceway groove of the inner ring; and
a ring-shaped lubricant supply member that is fixed to the ring-shaped member fitted portion while being in contact with the step portion, wherein:
the ring-shaped member fitted portion is an annular groove that is located in an outer periphery of the inner ring, and
the lubricant supply member is fixedly fitted in the annular groove,
the ball bearing further comprising a shield plate that is fixed to the outer ring, that is located with a clearance left between the shield plate and the outer periphery of the inner ring, and that overlaps with the lubricant supply member in a radial direction of the inner ring, wherein
when a maximum outside diameter of a portion of the outer periphery of the inner ring, the portion being located on an opposite side of the annular groove from the outer periphery raceway groove in an axial direction of the inner ring, is Di, an inside diameter of the lubricant supply member is dL, an inside diameter of the shield plate is dZ, an elastic deformation limit of the lubricant supply member in the radial direction is $\delta L$, and an outside diameter of the lubricant supply member is DL, $Di < dL+\delta L$ and $DL < dZ$ are satisfied.

2. The ball bearing according to claim 1, wherein when a linear expansion coefficient of the inner ring is k1, a linear expansion coefficient of the lubricant supply member is k2, and a temperature obtained by subtracting a room temperature from an upper limit of operating temperature of the ball bearing is $\Delta T$, $Di+k1\cdot\Delta T\cdot Di > dL+k2\cdot\Delta T\cdot dL$ is satisfied.

* * * * *